United States Patent
Niedecker

(10) Patent No.: US 6,390,912 B1
(45) Date of Patent: May 21, 2002

(54) HANGING LOOP FOR SAUSAGES OR THE LIKE AND A METHOD FOR THE PRODUCTION THEREOF

(75) Inventor: Frank Niedecker, Cannobio (CH)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/623,444

(22) PCT Filed: Mar. 13, 1999

(86) PCT No.: PCT/EP99/01665

§ 371 Date: Jan. 29, 2001

§ 102(e) Date: Jan. 29, 2001

(87) PCT Pub. No.: WO99/51104

PCT Pub. Date: Oct. 14, 1999

(30) Foreign Application Priority Data

Apr. 7, 1998 (DE) .......................................... 198 15 574

(51) Int. Cl.[7] .......................... A22B 7/00; A22B 15/00; A22B 17/02; A22C 21/00
(52) U.S. Cl. ..................... 452/185; 452/186; 452/187
(58) Field of Search .............................. 452/186, 185, 452/187

(56) References Cited

U.S. PATENT DOCUMENTS 5,772,499 A * 6/1998 Niedecker ................... 452/186

FOREIGN PATENT DOCUMENTS

| DE | 19 50 897 A | 4/1971 | |
|---|---|---|---|
| DE | 25 03 359 A | 7/1976 | |
| DE | 27 24 393 A | 11/1978 | |
| DE | 32 44 775 A | 6/1984 | |
| DE | 197 00 891 C | 1/1998 | |
| EP | 0 215 732 A | 3/1987 | |
| EP | 413166 * | 2/1991 | ................ 452/186 |
| FR | 2 579 871 A | 10/1986 | |

* cited by examiner

Primary Examiner—Charles T. Jordan
Assistant Examiner—Judith A. Nelson
(74) Attorney, Agent, or Firm—Norris McLaughlin & Marcus

(57) ABSTRACT

The invention relates to a hanging loop for sausages or the like which is made of a meltable loop thread whose free ends are fused and tied together into a fisherman's knot. The invention also relates to an arrangement of these knotted hanging loops which are fastened on a carrier strip and in such a way that partial loops project from both sides of the carrier strip and such that the hanging loop knots are located in the proximity of the location where the hanging loops are fastened to the carrier strip. The invention also relates to a method for producing the hanging loop in which the loop thread is firstly arranged into a loop and ties into a knot. Afterwards, the loop thread projecting from the knot and outside the loop is cut away using a high temperature such that the loop thread ends produced thereby are attached by melting.

5 Claims, 4 Drawing Sheets

HANGING LOOP FOR SAUSAGES OR THE LIKE AND A METHOD FOR THE PRODUCTION THEREOF

This application is a 371 of PCT/EP99/01665, filed Mar. 13, 1999.

This invention relates to a suspension loop for sausages or the like, which is formed in that the free ends of a loop thread of meltable material are tied into a knot. The invention also relates to an arrangement of such knotted suspension loops which are fastened on a carrier strip, and to a method of producing such suspension loops.

Suspension loops consisting of a loop thread the two ends of which are connected with each other by a knot such that the loop thread forms a closed loop are known per se. The knot by means of which the two ends of the loop thread are connected with each other is known under the term cat's head. This knot is chosen because the knot does not move along the loop thread when it is pulled tight, and thus ensures that the knot does not slip off the loop ends when it is pulled tight, or that one loop end is withdrawn from the knot when the knot is pulled tight. The cat's head is similar to a slipstek, when the latter is tied into a knot with two parallel ropes.

The loops usually have an oblong shape, so that a longitudinal alignment can be allocated thereto. To be able to magazine the loops and automatically supply them to a machine, a plurality of loops are known to be fastened on a carrier strip.

The suspension loops described as well as arrangements of such loops on a carrier strip are known for instance from DE-PS 23 52 000 and CH-PS 661 841. In both references, arrangements are described in which the carrier strip extends transverse to the longitudinal direction of the suspension loops such that open partial loops project from both sides of the carrier strip. In accordance with DE-PS 23 52 000 the suspension loops are disposed on the carrier strip one beside the other, whereas they laterally overlap each other in accordance with CH-PS 661 841.

By means of the carrier strips, the suspension loops are supplied for instance to a sealing machine for sausages. When sealing a sausage, the sausage casing crimped to form a neck is inserted in an at first open clip together with a suspension loop, which clip is then closed. When introducing the suspension loops into the sealing machine and when inserting the loops into the clip, problems occur quite frequently, because the successive loops get entangled with each other. Such disturbances interrupt the production process and lead to undesired production losses.

For smoking purposes, the sausages sealed with a clip and provided with a loop are suspending on a smoking skewer. To this end, the suspension loops are threaded onto the smoking skewer, which frequently involves problems, because the threads of a loop are often twisted.

It is the object of the invention to largely eliminate the disadvantages of the prior art.

In accordance with the invention, this object is achieved by means of suspension loops as described above, wherein the ends of the loop threads are fused and connected with each other by a fisherman's knot. The fisherman's knot is that knot which is also used for making a firm eye in a rope.

In contrast to the cat's head, the loop thread of the fisherman's knot does not project from both sides of the knot, so that the knot does virtually not get caught in another suspension loop. However, it has not been possible so far to use the fisherman's knot for connecting the free ends of the loop thread, because it moves along the loop thread when it is pulled tight by applying a load and can therefore slip off the thread ends or one end of the loop thread can be withdrawn from the knot. It has turned out that such slipping of the knot off the ends of the loop threads or the withdrawal of an end of a loop thread from the knot can be avoided in that the free ends of the loop thread are attached by melting. Such melting of the loop thread resulted in the filaments of the loop thread being connected with each other and being fixed in their relative position with respect to each other. As a result, the diameter of the loop thread in the vicinity of the thread end can no longer be compressed as much as in the remaining part of the loop thread. Additionally or also alternatively, the loop thread is thickened as a result of such melting. The lack of compressibility of the loop thread at the point where it is fused or thickened leads to the fact that the fisherman's knot can no longer move beyond the free ends of the loop thread and thus slip off the loop thread.

The disadvantage of the fisherman's knot, namely its property of moving along the loop thread, even becomes an advantage in this connection, as when the knot is pulled tight it can easily be moved to close to the free thread ends—but not beyond the same. As a result, the free thread ends only minimally project from the knots and, in contrast to the cat's head, only on one side of the knot, so that the risk of the knot getting caught in another suspension loop is excluded.

Moreover, it turned out to be advantageous that the two ends of the loop threads are jointly attached by melting, so that they are fused with each other. This can for instance be done in a most simple way in that the loop thread is withdrawn from a reservoir, arranged into a loop, tied into a knot and subsequently cut off from the reservoir by means of a hot cutting knife such that at the same time the two ends of the loop thread formed are fused with each other. In addition, the ends of the loop thread projecting from the knot are thus shortened as far as possible. Moreover, this particularly desired effect is also achieved when the ends of the loop thread are not fused with each other by cutting them off using a high temperature, but each thread end is separately attached by melting.

A suitable method of producing the suspension loop is accordingly characterized in that the loop thread is first of all arranged into a loop and tied into a knot, and subsequently the loop thread projecting from the knot outside the loop is cut off using such a high temperature that the resulting ends of the loop thread are attached by melting.

The object underlying the invention can also be achieved by an arrangement of knotted suspension loops on a carrier strip, wherein partial loops project from both sides of the carrier strip, and wherein the knots of the suspension loops are located close to the point where the suspension loops are fastened on the carrier strip.

This arrangement is based on the knowledge that the loop threads are slightly twisted when their two ends are tied into a knot, so that the closed loop tends to twisting. This tendency is reduced on the one hand by using the fisherman's knot instead of the cat's head. In addition, an existing twist of the loop thread is absorbed by the carrier strip, since the loop thread is fastened on the same, and in this way a twisting of the suspension loops is effectively prevented, as the knot is located in the vicinity of the carrier strip.

There is preferably used an arrangement where the partial loops have different sizes, and where the knots of the suspension loops are located on the carrier strip side of the smaller partial loops.

It was found out that in the inventive suspension loops there are no more any disturbances due to the fact that the knot of one suspension loop gets caught in another suspension loop. The knots are also prevented from getting caught in the sealing machine. Moreover, it does no longer occur that a sausage casing bursts as a result of the knot disturbing when the loop is passed through the casing brake of a machine for filling sausages. All these effects are also achieved alone by the described arrangement of suspension loops on the carrier strip and are even increased in their effect by the combination of the inventive suspension loops with the described arrangement of suspension loops.

The invention will now be described in detail by means of embodiments with reference to the drawings, wherein.

Figure 1:
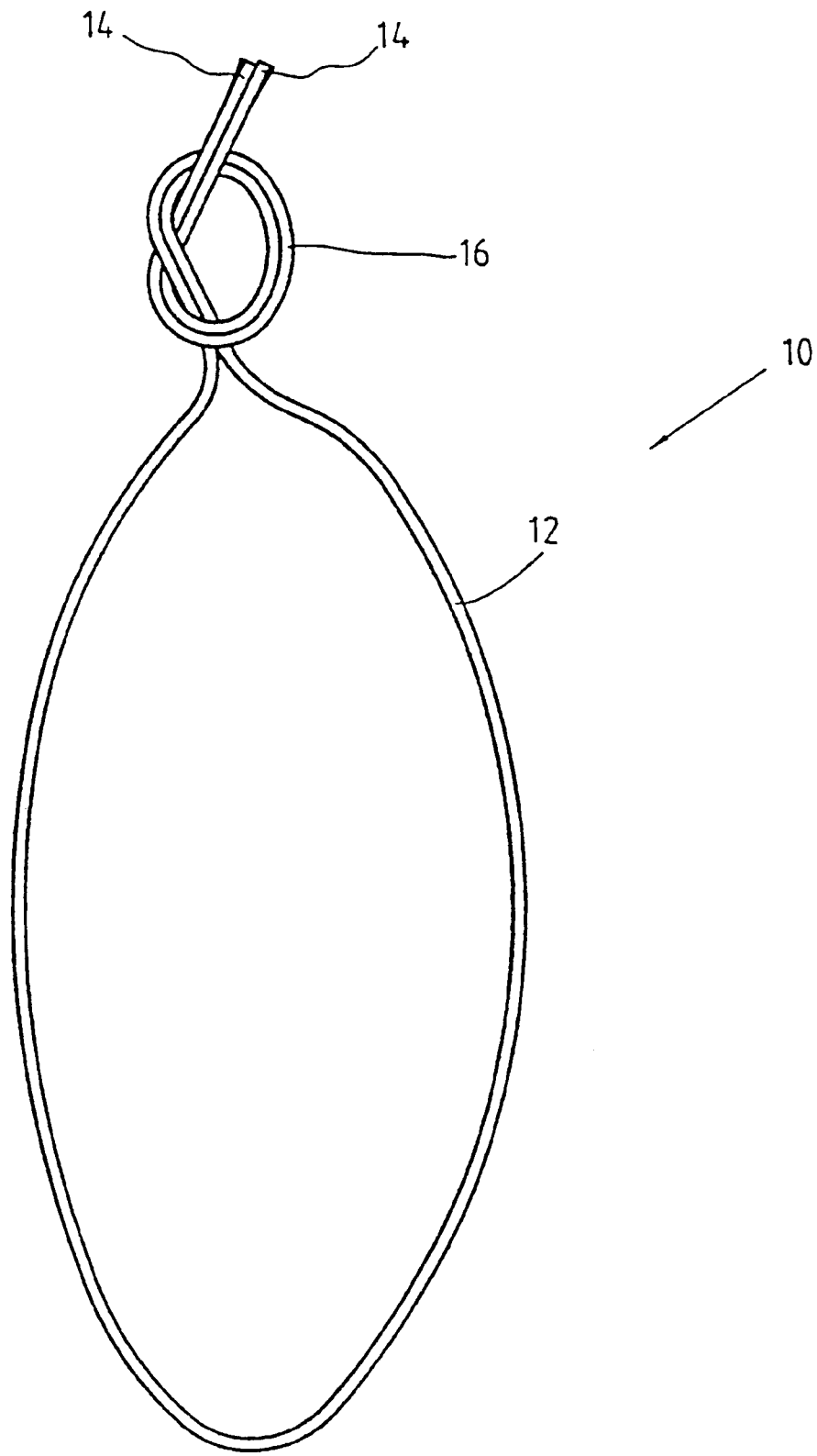
FIG. 1 shows a suspension loop whose free ends are connected with each other by a fisherman's knot.

The suspension loop 10 of FIG. 1 consists of a loop thread 12, whose free ends 14 are connected with each other by a fisherman's knot 16, so that the suspension loop 10 is closed. The free ends 14 are each fused, so that the free ends 14 represent a slub as compared to the remaining loop thread 12.

These slubs prevent the fisherman's knot 16 from slipping beyond the free ends 14 of the loop thread 12 when the knot is pulled tight by applying a load.

Figure 2:
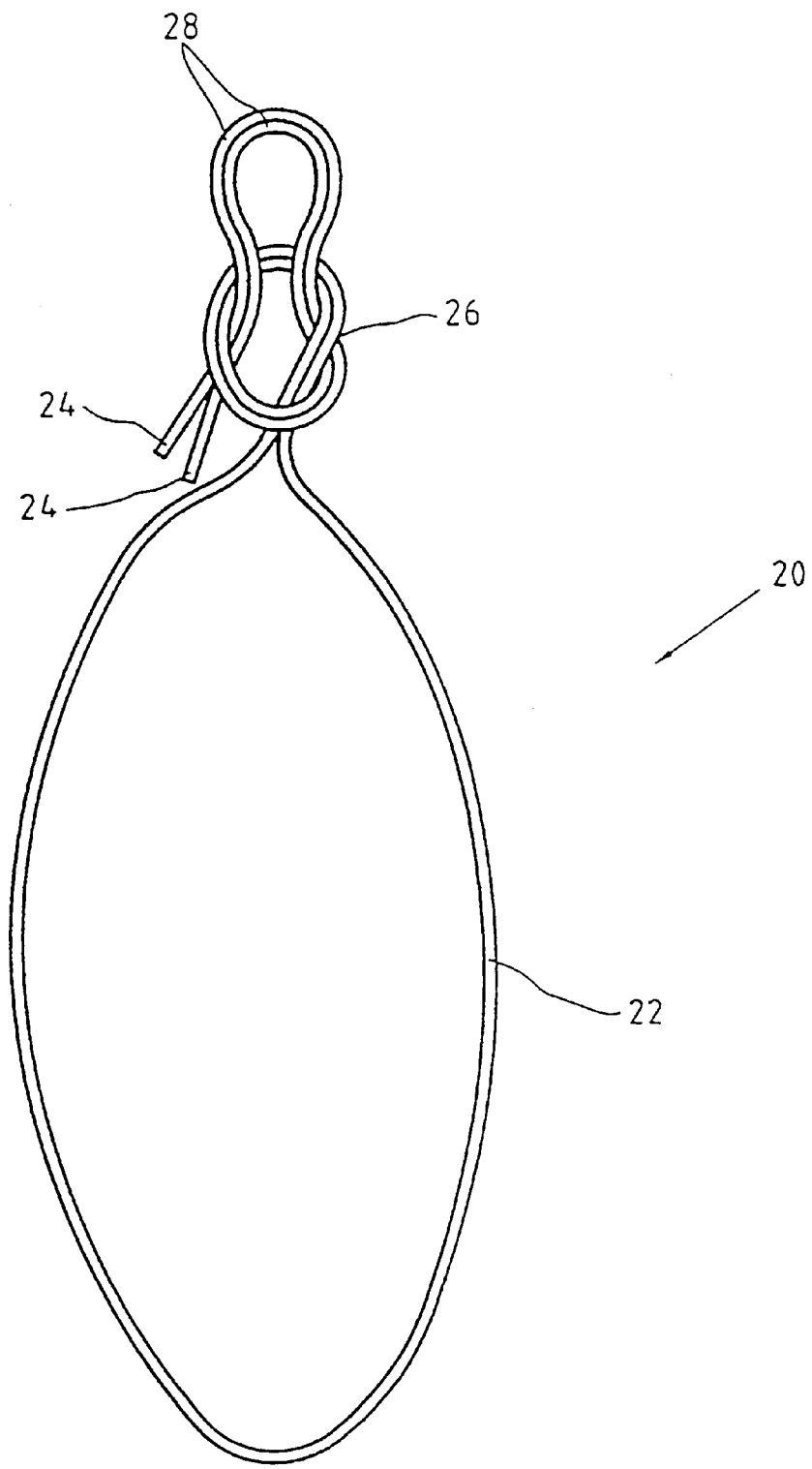
FIG. 2 shows a suspension loop in accordance with the prior art.

For comparison purposes, FIG. 2 illustrates conventional suspension loops 20 corresponding to the prior art. These suspension loops 20 are formed by a loop thread 22, whose free ends 24 are connected with each other by a knot 26 referred to as cat's head, so that the suspension loop 20 is closed. The knot 26 was chosen because it does not slip on the loop thread 22 when the knot is pulled tight by applying a load. It can, however, be seen that the loop thread 22 projects from both sides of the knot 26, namely from one side in the form of the free ends 24, and from the other side in the form of knot loops 28. Due to these projections, the knot 26 tends to get caught.

Figure 3:
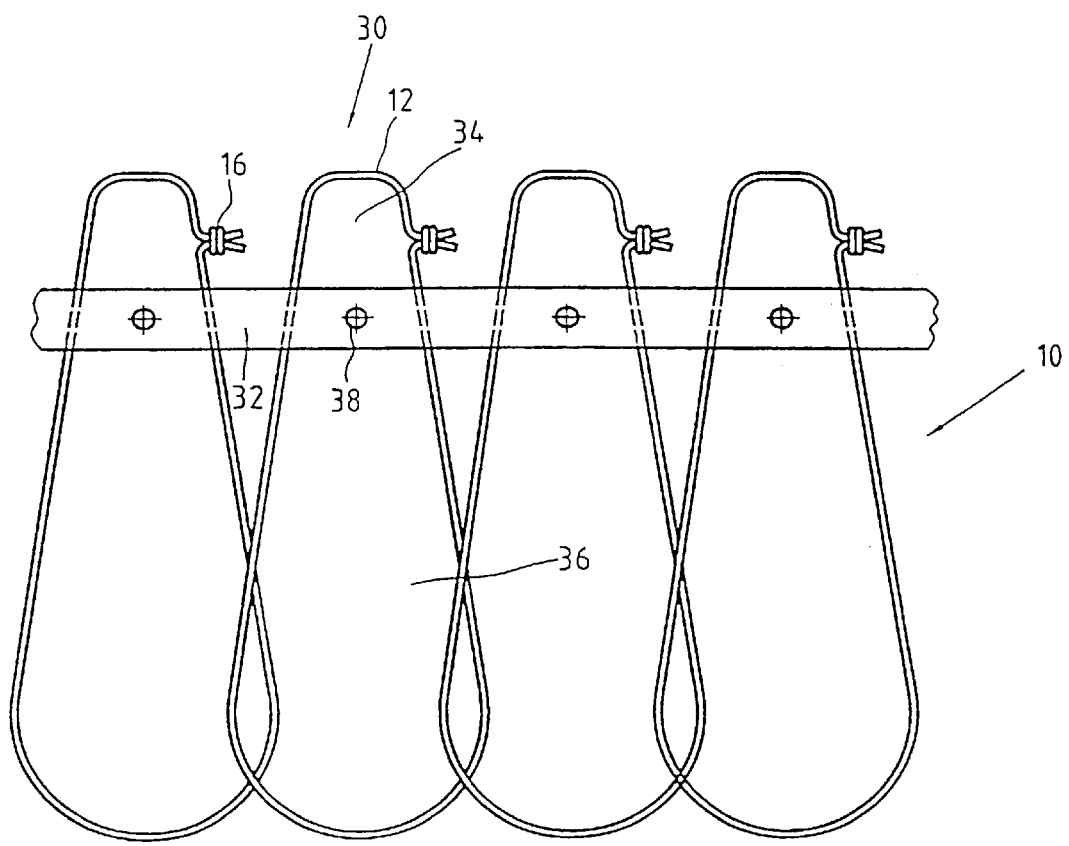
FIG. 3 shows an arrangement of suspension loops fastened on a carrier strip.

In the arrangement 30 of suspension loops 10 as shown in FIG. 3, the suspension loops 10 are fastened one beside the other on a carrier strip 32. The fastened suspension loops 10 have an oblong shape, so that they can be ascribed a longitudinal orientation. The suspension loops 10 are fastened on the carrier strip 32 such that the carrier strip 32 extends transverse to the longitudinal orientation of the suspension loops 10, and that—with reference to the drawing—smaller partial loops 34 project above the carrier strip 32, whereas larger partial loops 34 project below the carrier strip. The knot 16 of each suspension loop 10 is disposed in the area of the smaller partial loop 34 in the vicinity of the carrier strip 32. Because each knot 16 is thus in direct vicinity of a point where the suspension loops 10 are fastened on the carrier strip 32, a spin possibly produced by the knot 16 in the loop thread 12 is absorbed by the point of attachment and cannot lead to a twisting especially of the larger partial loops 36.

The carrier strip 32 may either be made of paper or of plastics. At the same distance at which the suspension loops 10 are fastened on the carrier strip, it has holes 38, which serve the mechanical transport of the carrier strip 32. The holes 38 are each disposed inside the suspension loop 10. For fastening the suspension loops 10 on the carrier strip 32, the suspension loops 10 are adhered or sealed onto the carrier strip 32.

Figure 4:
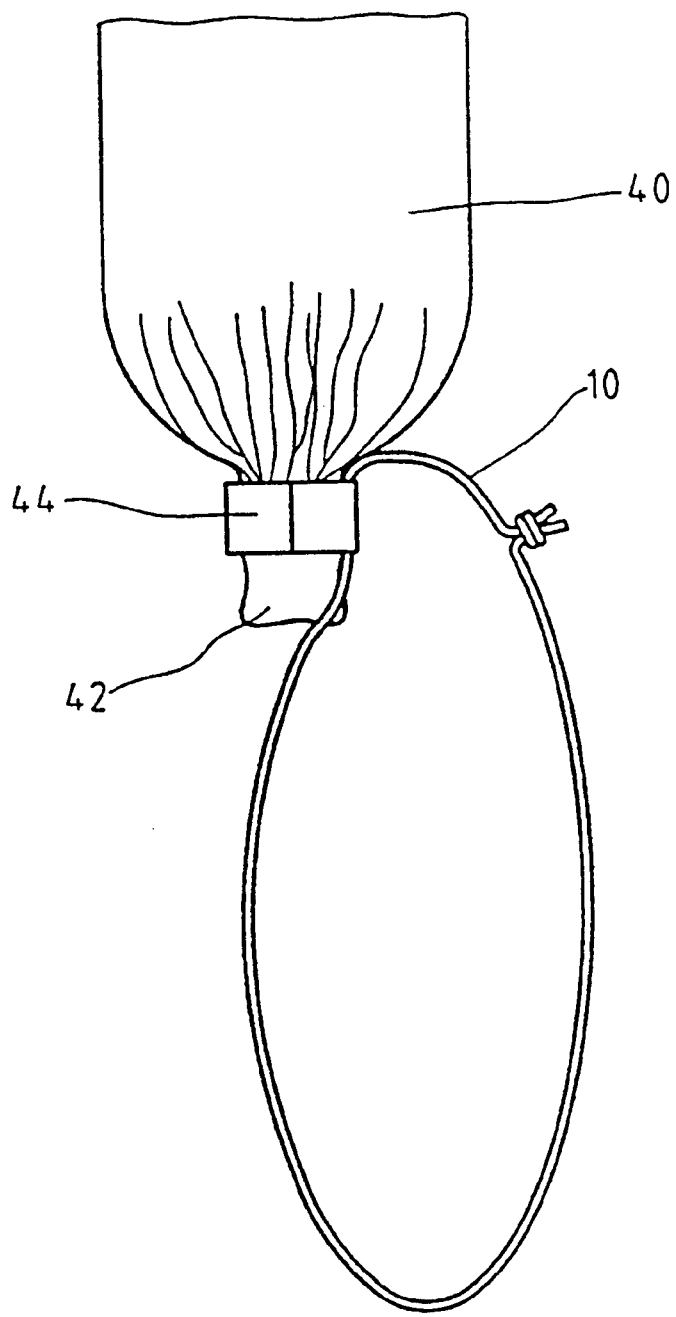
FIG. 4 shows a suspension loop attached to a sausage end.

For supplying the carrier strip 32 to the sealing point of a sealing machine for sausages or the like, one suspension loop 10 is each withdrawn from the carrier strip 32 during each sealing operation, and together with the sausage casing to be sealed is inserted in an open closure clip, which is subsequently closed by the sealing machine. In this way, the arrangement shown in FIG. 4 is obtained. A filled sausage casing 40 has been gathered at one end 42 to form a neck and has been sealed by means of a closure clip 44. Into the closure clip 44 there has also been inserted a suspension loop 10 and in this way been connected with the filled sausage casing 40, so that the corresponding sausage can for instance be threaded onto a smoking skewer by means of the loop 10. The carrier strip 32 was removed from the loop 10.

By using preferably rigid thread material, the loop 10 separated from the carrier strip 32 forms an oval shape, so that threading onto the smoking skewer can easily be effected.

What is claimed is:

1. A suspension loop for sausages or the like, formed by a meltable loop thread whose free ends are tied into a knot, wherein said knot is a fisherman's knot and each of said free ends of the loop thread are thickened by melting.

2. The suspension loop as claimed in claim 1, wherein the ends of the loop thread are fused to each other by melting.

3. An arrangement of knotted suspension loops of claim 1, fastened on a carrier strip, wherein partial loops project from each of two sides of the carrier strip, and wherein the knot of each suspension loop is located close to the point where said suspension loop is fastened on the carrier strip.

4. The arrangement as claimed in claim 3 wherein the partial loops projecting from one side of the carrier strip have different sizes than those projecting from the other side and said knots are located on the carrier strip side of the smaller of said partial loops.

5. A method of producing the suspension loop of claim 1, wherein the loop thread is first of all arranged into a loop and tied into a knot, and subsequently the loop thread projecting from the knot outside the loop is cut off using such a high temperature that the resulting loop thread ends are attached by melting.

* * * * *